Figure 1:
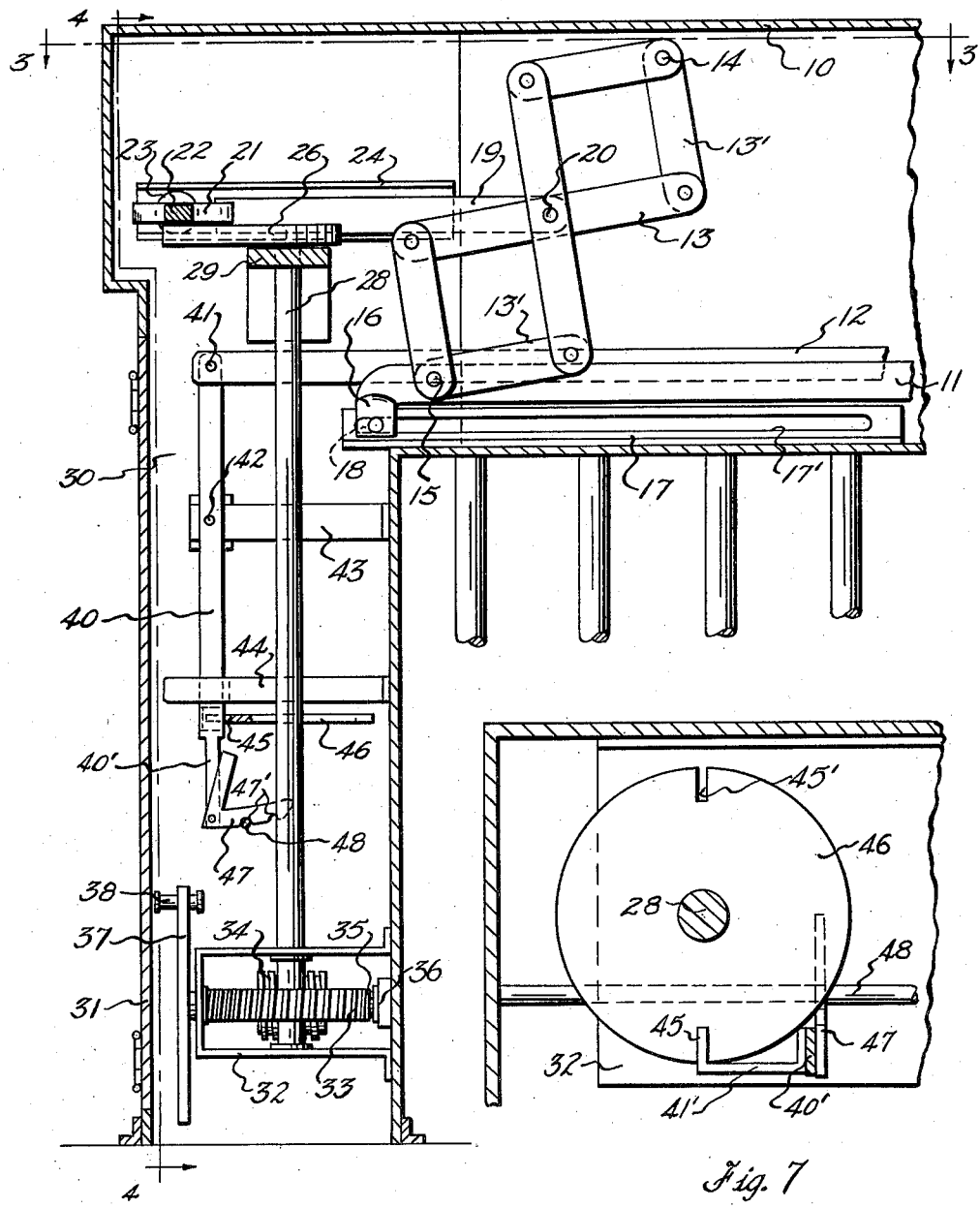

Inventor
JAMES A. YOUNGBLOOD
By Jack A. Ohley
Attorney

July 26, 1938. J. A. YOUNGBLOOD 2,125,142
OPERATING MECHANISM FOR DOORS
Filed Nov. 9, 1936 7 Sheets-Sheet 5

Inventor
JAMES A. YOUNGBLOOD
By Jack A. Ashley
Attorney

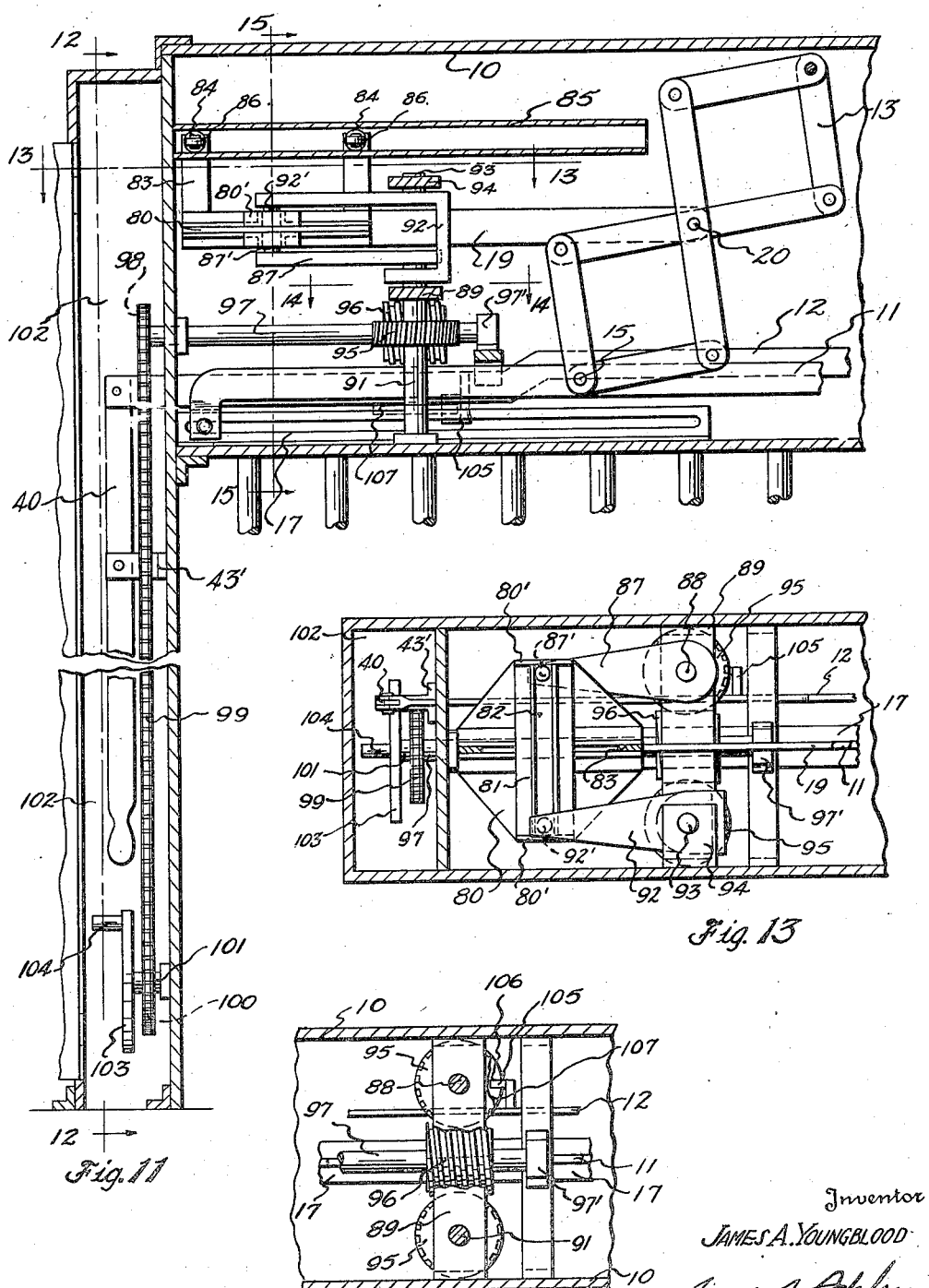

July 26, 1938.  J. A. YOUNGBLOOD  2,125,142
OPERATING MECHANISM FOR DOORS
Filed Nov. 9, 1936  7 Sheets-Sheet 7
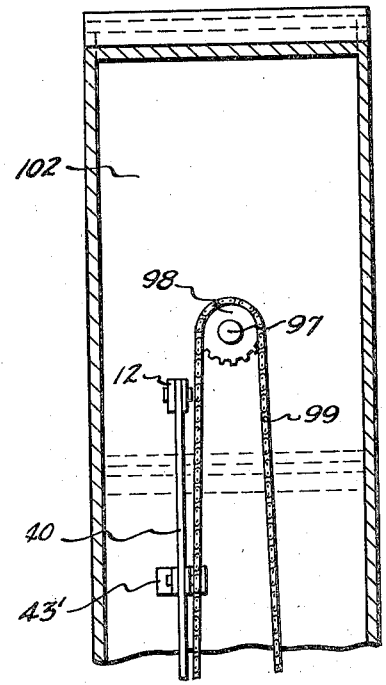
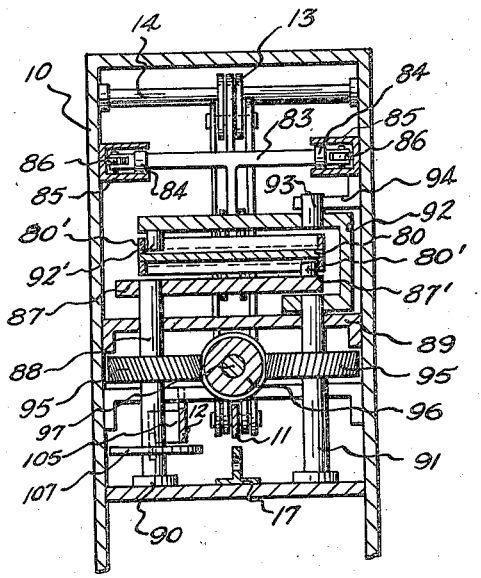
Fig. 15
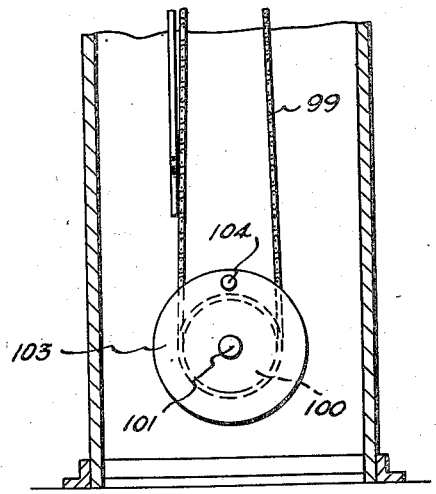
Fig. 12
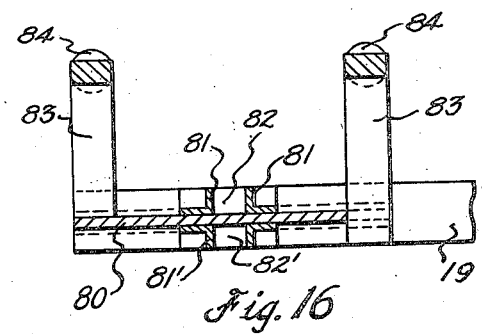
Fig. 16
Inventor
JAMES A. YOUNGBLOOD
By Jack A. Ashley
Attorney Patented July 26, 1938

2,125,142

UNITED STATES PATENT OFFICE 2,125,142

OPERATING MECHANISM FOR DOORS

James A. Youngblood, Dallas, Tex.

Application November 9, 1936, Serial No. 109,927

13 Claims. (Cl. 189—7)

This invention relates to new and useful improvements in operating mechanism for doors.

One object of the invention is to provide an improved mechanism which is particularly adapted for use with the doors of jail cells which are ordinarily located in a row or block, the mechanism being so constructed that the doors may all be operated from a single place at any point along the cell block.

An important object of the invention is to provide an improved operating mechanism for jail doors which is so arranged that it imparts a slow movement to the doors upon initial operation and gradually increases the speed of movement during the intermediate portion of the travel of said door, after which a gradual deceleration occurs to bring the doors to a stop, whereby the inertia of the door is overcome at the beginning and end of travel, which facilitates the initial operation of the doors and eliminates the jarring or banging incidental to the sudden stopping of the movement of the doors when reaching the terminus of their travel under high momentum; thereby obviating the damaging effects of shock to the operating mechanism.

Another object of the invention is to provide an improved operating mechanism for jail doors, which is so constructed that it will operate in a minimum amount of space, whereby substantially no addition to the usual cell block is necessary to accommodate the mechanism.

A further object of the invention is to provide an improved mechanism for operating cell doors which may be mounted at any point above the cell doors and readily connected to all of the doors to operate the same; said mechanism being readily operable from any point in front of said cell doors, whereby it is not necessary that the mechanism be mounted at one end of the line of cell doors as has been the usual practice.

Still another object of the invention is to provide an improved operating mechanism including a pair of swinging crank arms which are constructed to impart a straight line movement to a movable door actuating member, the arms acting to move the member from zero at the start of travel, gradually increasing the speed of movement to a maximum at the midportion of the travel, and then gradually decelerating the rate of movement to zero at the end of the travel, whereby the travel of the doors is started slowly, then gradually accelerated to maximum at midtravel, and gradually decelerated to the terminus of travel; the arms not only making for perfect gradual acceleration and deceleration minimize inertia but also providing exactly equal acceleration and deceleration of the movement of the doors in each half of their travel in either direction, thus reducing frictional resistance to operation, and facilitating the actuation of the mechanism.

Still another object of the invention is to provide an improved operating mechanism which has all of the above advantages, and which is constructed of a minimum number of parts, which not only reduces manufacturing costs but also makes for easier installation; the reduction of the number of working parts reducing the necessity of constant adjustment and also eliminating undue wear, disorder or breakage; the mechanism being constructed so that the movement of the doors may be halted and will remain in any intermediate position, whereby possibility of operating the entire mechanism in a reverse direction by grasping and manually moving the doors, is obviated.

A still further object of the invention is to provide an operating mechanism for opening and closing jail doors which may be correlated with the locking mechanism for the doors, whereby said locking mechanism cannot be actuated unless the doors are in either an entirely open or an entirely closed position, and similarly said operating mechanism cannot be operated to open or close the doors unless said locking mechanism has previously been actuated to unlock said doors.

A construction designed to carry out the invention will be hereinafter described, together with other features of the invention.

Figure 2:
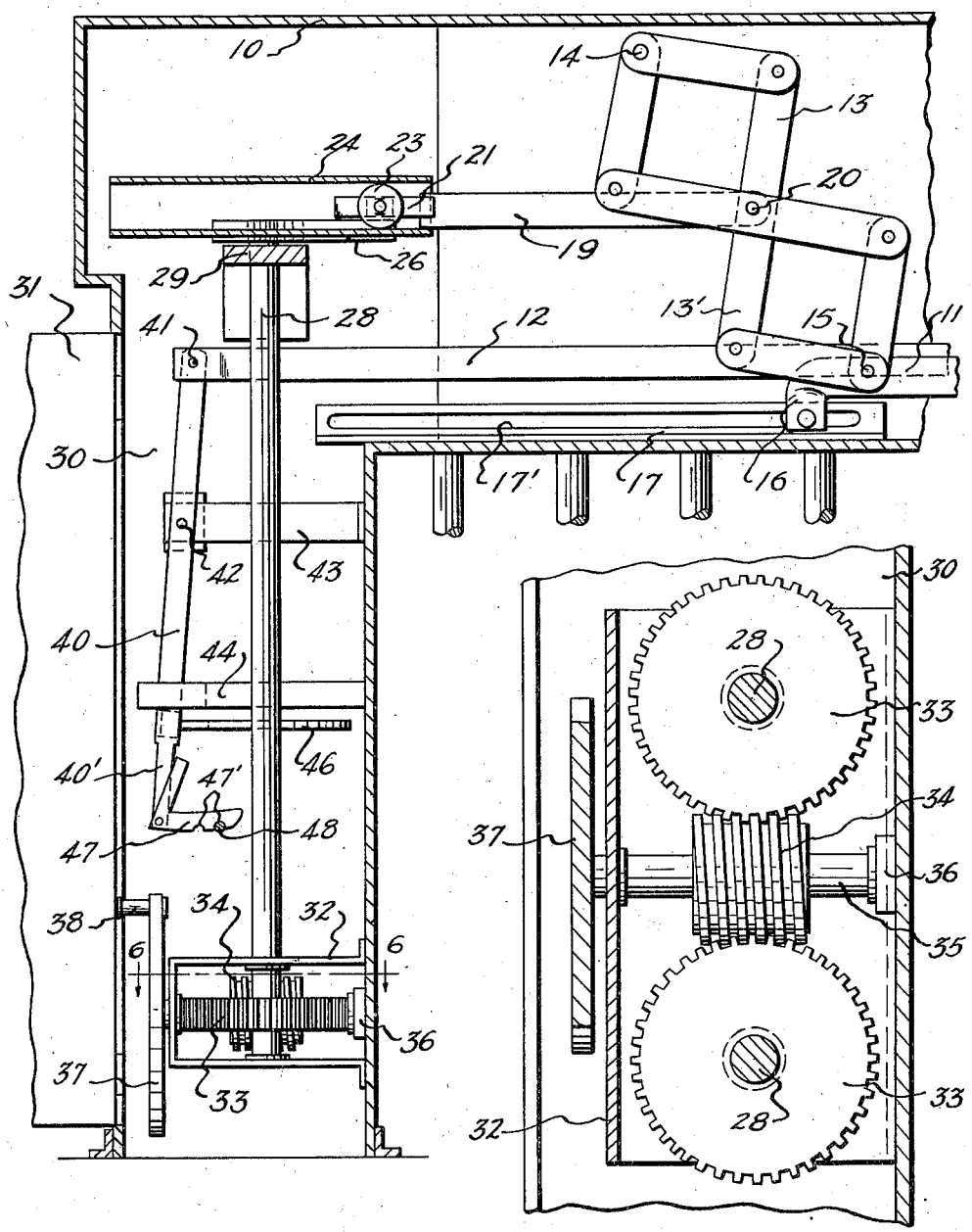
Figure 3:
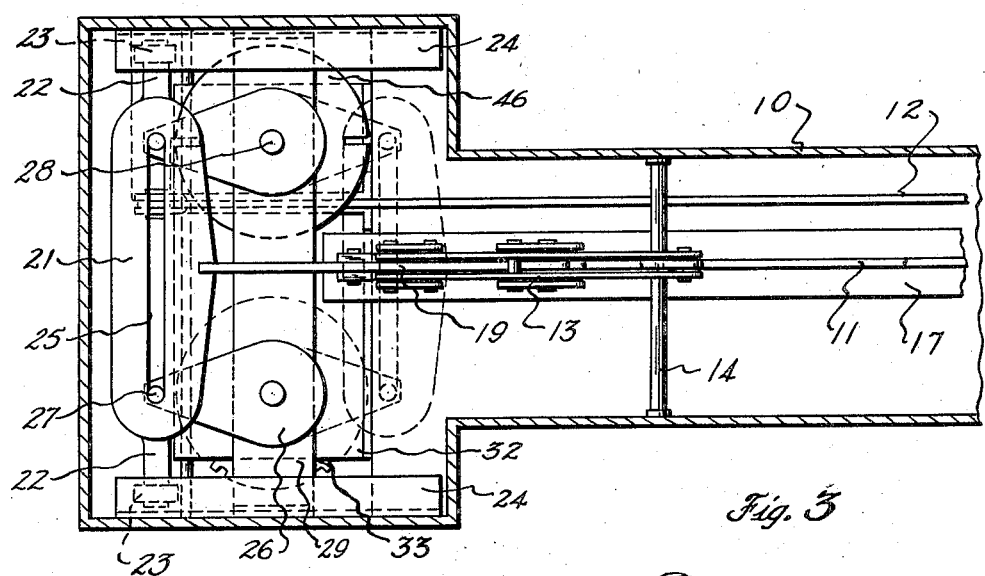
Figure 5:
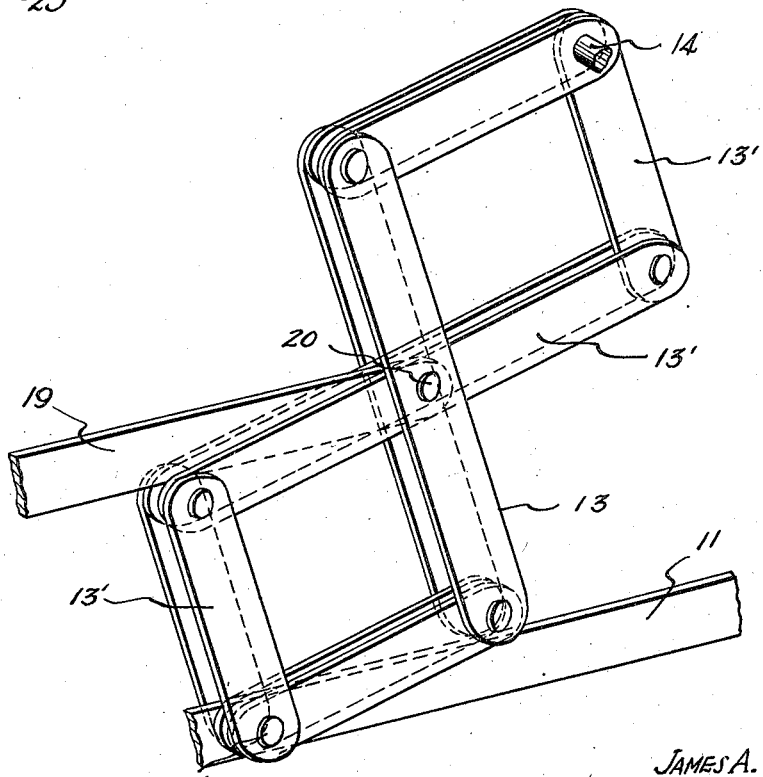
Figure 4:
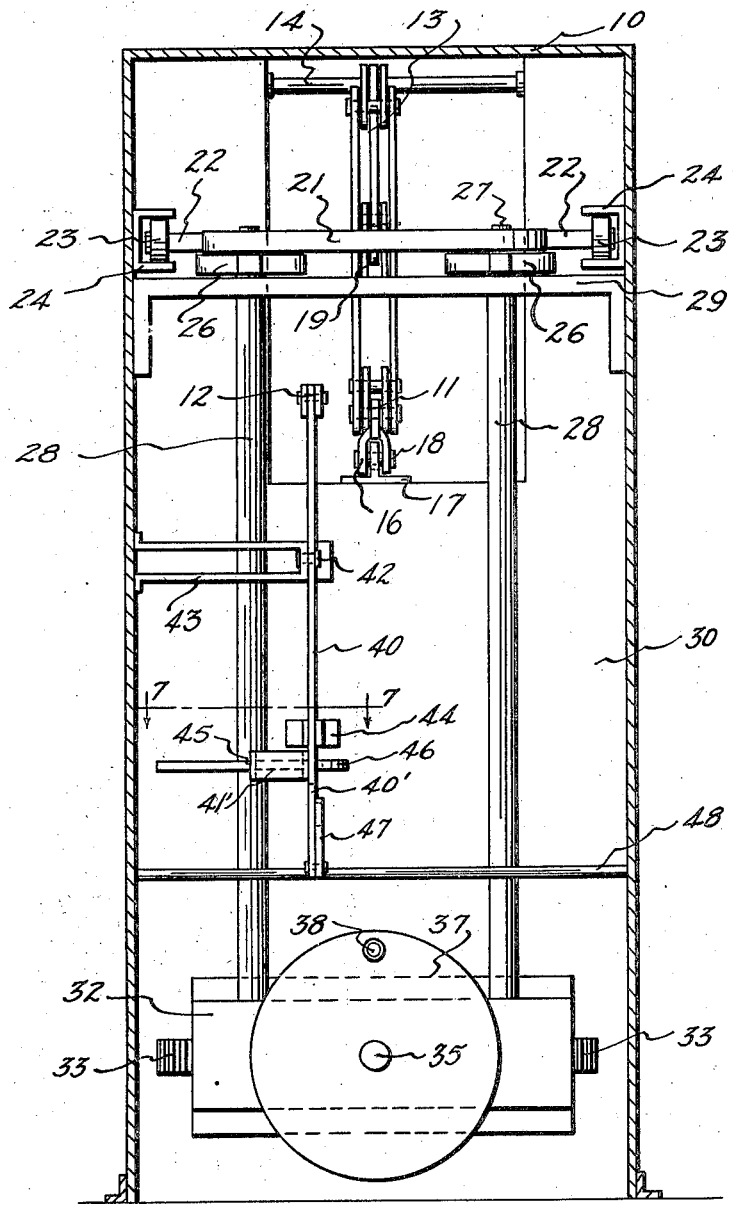
Figure 8:
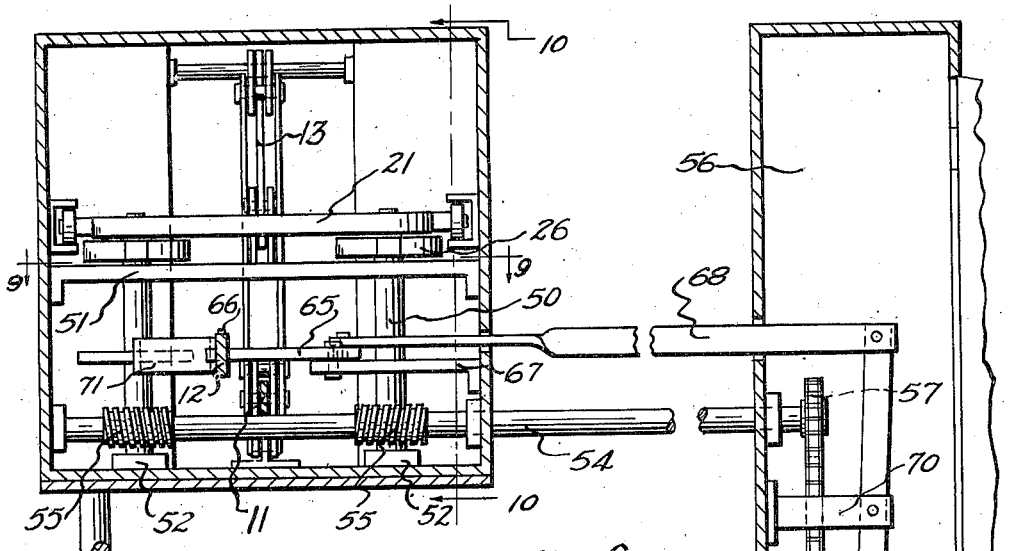
Figure 9:
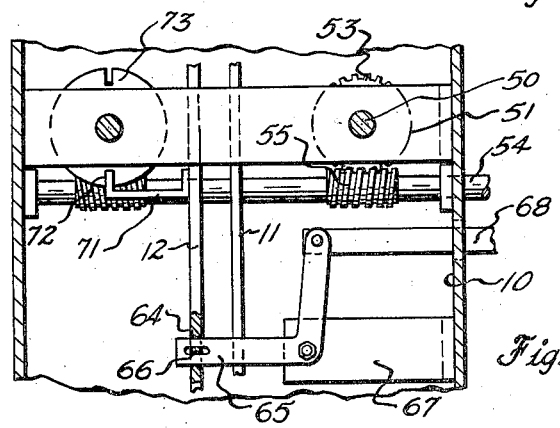
Figure 10:
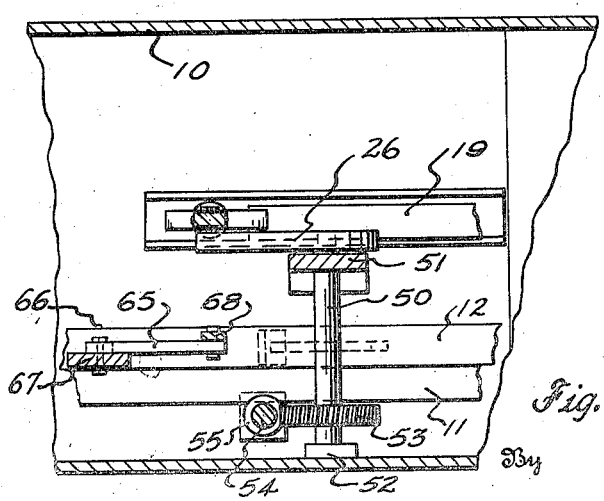

The invention will be more readily understood from a reading of the following specification and by reference to the accompanying drawings, in which an example of the invention is shown, and wherein:

Figure 1 is a vertical sectional view of one end of a cell block, having the operating mechanism, constructed in accordance with the invention, and showing the position of said mechanism when the jail doors are closed, Figure 2 is a similar view, showing the position of the mechanism when said doors are open, Figure 3 is a horizontal, cross-sectional view, taken on the line 3—3 of Figure 1, Figure 4 is a transverse, vertical sectional view, taken on the line 4—4 of Figure 1, Figure 5 is an isometric view of the lazy tongs, Figure 6 is a horizontal, cross-sectional view, taken on the line 6—6 of Figure 2, Figure 7 is a horizontal, cross-sectional view, taken on the line 7—7 of Figure 4, Figure 8 is a transverse, vertical sectional view, taken at an intermediate point through the cell block, and showing the mechanism mounted above any cell intermediate the ends of the block, Figure 9 is a horizontal, cross-sectional view, taken on the line 9—9 of Figure 8, Figure 10 is a vertical, sectional view, taken on the line 10—10 of Figure 8, Figure 11 is a view, similar to Figure 1, showing a modified form of the invention, Figure 12 is a transverse, vertical sectional view, taken on the line 12—12 of Figure 11, Figure 13 is a horizontal, cross-sectional view, taken on the line 13—13 of Figure 11, Figure 14 is a horizontal, cross-sectional view, taken on the line 14—14 of Figure 11, Figure 15 is a transverse, vertical sectional view, taken on the line 15—15 of Figure 11, and Figure 16 is a longitudinal, sectional view of the actuating member of the modified form.

In the drawings, the numeral 10 designates one end of the usual casing or housing which is mounted above the ordinary row or block of jail cells. The casing extends throughout the entire length of the row or block and houses the longitudinally extending door propelling bar 11, and the door locking bar 12. The door propelling bar 11 extends longitudinally throughout the length of the cell row or block and is suitably connected with the door (not shown) of each cell. A longitudinal movement of said bar will, therefore, open or close said doors depending on the direction of movement. The locking bar 12 extends contiguous to the door propelling bar 11 and is suitably connected to the door locking mechanism (not shown) of each door, whereby a longitudinal movement of said bar will lock or unlock the doors, as the case may be. It is noted that the particular connection between the door propelling bar 11 and each door, as well as the particular locking mechanism which the locking bar 12 operates, form no part of the present invention and are, therefore, subject to variation.

For imparting a longitudinal movement to the door propelling bar so as to operate the jail doors (not shown), a lazy tongs 13 is provided. The tongs are, of course, constructed in the usual manner being composed of a plurality of pivotally connected links 13'. The upper end of the lazy tongs is pivoted on a transverse shaft 14, which is located at the upper portion of the casing 10 (Figures 1 and 2). The lower end of the lazy tongs is pivoted by a pin 15 to the end of the door propelling bar 11, and it will be obvious that when said tongs are swung on the shaft 14, a longitudinal movement will be imparted to the door propelling bar. For guiding the end of the bar 11 in its longitudinal movement, said bar is provided with a yoke 16 at its outer end. This yoke straddles a longitudinal guide rail 17, which rail is provided with an elongate slot 17' therein. A guide roller 18 is mounted in the yoke 16 and extends through the slot 17', whereby when the bar 11 is moved longitudinally, said roller riding in the slot will act to guide and support the outer end of the bar in its movement.

For imparting motion to the lazy tongs 13 so as to actuate the same, an elongate actuating bar 19 has one end pivoted on the central pivot pin 20 of said lazy tongs. The other end of the actuating bar is secured to a transversely extending yoke member 21, which member is arranged to move longitudinally within the casing 10. It is noted that the lazy tongs and bar 19 are preferably located centrally, or substantially so between the side walls of said casing. The casing is extended beyond the end cell of the block and it is in this extended portion that the yoke member 21 is arranged to travel, as is clearly shown in Figure 3. For guiding the member 21 in its travel, said member is provided with outwardly extending arms 22 at each end thereof, and rollers 23 are journaled on the outer end of these arms. The rollers are mounted to travel within channeled tracks 24 which are secured to the side walls of the extended portion of the casing. With such arrangement, it is obvious that the member is guided so as to travel in a straight line within the casing.

For imparting a motion to the yoke member 21 to actuate the lazy tongs 13 and thereby move the propelling bar 11 longitudinally of the casing, said member is provided with an elongate slot 25. A pair of crank arms 26 are located one on each side of the casing 10 just below the member 21 and each arm is provided with an upwardly extending pin or lug 27 which is adapted to engage and ride in the slot 25 of the member 21. Each crank arm is carried by the upper end of a vertical shaft 28 which shaft has its upper end supported in a transverse bracing member 29. The lower end of the shaft extends downwardly from the casing 10 and into a control compartment 30 which is formed adjacent the end cell in the block. The compartment 30 may be a part of the casing 10, and this compartment is provided with a door 31 whereby access to the interior thereof, may be had. The lower end of each shaft 28 is journaled in a U-shaped supporting bracket 32 which bracket has its rear end secured to the rear wall of the compartment (Figures 1, 2 and 3). A gear 33 is secured on the lower end of each shaft 28 and a worm 34 is interposed between the gear 33, being in constant mesh therewith. The worm is suitably secured on a rotatable shaft 35 which extends through the forward end of the bracket 32 and has its rear end journaled in a suitable bearing 36 which is secured to the rear wall of the compartment 30. The outer end of the worm shaft 35 has an enlarged operating disk 37 secured thereon and a suitable handle 38 is mounted in the peripheral portion of this disk, whereby manual operation or rotation of the worm shaft may be accomplished.

With this arrangement, it will be obvious that when the worm 34 is rotated, a rotation will be imparted to the vertical crank shaft 28, whereby the crank arms 26 are swung. Since the outer end of each crank arm has connection with the member 21 by means of the pin 27 and slot 25, it is manifest that a swinging of said crank arm will impart a longitudinal movement to the yoke member 21 and actuating bar 19. A movement of the bar 19 will, of course, actuate the lazy tongs 13, whereby an increased movement will be imparted to the longitudinal propelling bar 11, whereby operation of the doors (not shown) is accomplished. By rotating the worm 34 in an opposite direction, the motion of the member 21 will be reversed to actuate the doors in a reverse direction.

With the parts in the position shown in Figures 1 and 3, it will be assumed that the doors are in their completely closed position. At this time the pin 27 at the outer end of each crank arm 26 is in longitudinal alinement with the crank shaft 28 of said crank arm. As the crank shafts 28 are rotated the crank arms will move inwardly toward the center of the casing 10 and since the pins 27 of said arms are engaged in the slot 25 of the yoke member 21, a motion will be imparted to said member. Due to the initial position of the crank arm, it will be obvious that upon initial movement of said arm a slow movement will be transmitted to the member 21, whereby the longitudinal propelling bar 11 is moved slowly at the start of this motion. This causes the doors (not shown) to be moved slowly at the beginning of their travel.

As the crank arms continue their rotation or swinging movement, it will be obvious that as they approach each other toward the center of the casing, the speed of travel of the member 21 will be gradually accelerated or increased, whereby after the door is started in motion its travel will be gradually increased. When the crank arms 26 have reached the center of their travel, which is at a point when the pins 27 on each crank arm lie in the same transverse vertical plane as the crank shafts 28, the maximum speed of travel of the member 21 is reached. From this point until the crank arms reach the end of their stroke or after they have travelled through an arc of 180 degrees the speed of travel of the member 21 is gradually decelerated to zero. Therefore, it will be seen that the travel of the doors (not shown) which are connected with the member 21 through the lazy tongs 13 and propelling bar 11, is gradually accelerated to the mid-point of its travel after which a gradual deceleration occurs until the doors are brought to a slow stop at the end of their travel. It is noted that the increase and decrease of the speed of the doors is equal in either direction and this movement facilitates the operation of the doors as the inertia of said doors is overcome. Slamming or jarring of the jail doors is entirely eliminated and the resultant wear and shock on the operating mechanism due to the sudden stopping upon reaching the terminus of travel under high momentum, is avoided. It is much easier for the operator who is rotating the worm shaft 35 to start the doors in motion because of the construction of the crank arms 26 and the member 21. The parts are few in number and since the member 21 is provided with positive guide means during its travel, there is no danger of any of the parts becoming disconnected or out of adjustment. The worm 34 may be rotated in either direction to either open or close the door and since said worm is employed to indirectly actuate the doors through the medium of the gears 33 and crank arms, the doors may be stopped at any intermediate point between open or closed position and the mechanism cannot be operated by grasping said doors and pulling the same one way or the other. This is due to the fact that with the arrangement shown, the pitch of the teeth on the worm 34 may be sufficiently close to the vertical to prevent the gears 33 from turning the worm.

Any suitable means may be employed for imparting a longitudinal movement to the locking bar 12 which controls the locking and unlocking of all the doors (not shown) in the row or block of cells. However, I prefer to employ an actuating lever 40 which has its upper end pivoted on a pin 41 to the outer end of the locking bar. The lever 40 extends downwardly within the compartment 30 and is pivoted near its upper end on a pin 42 which is supported in a suitable bracket 43 secured to the rear wall of the control compartment. The lower end of the lever is provided with a suitable handle 40' which is slidable between a guide yoke 44 extending outwardly from the inner wall of the compartment. It will be obvious that when the lower end of the lever 40 is swung inwardly the upper end of said lever will be moved outwardly toward the outer side of the compartment 30. This movement of the upper end of the lever will move the locking bar 12 in a direction to the left in Figure 1.

When the operating mechanism for imparting a motion to the door propelling bar 11 is in the position shown in Figure 1, with the jail doors (not shown) in a closed position, the actuating lever 40 is also in the position shown in Figure 1, whereby the locking mechanism (not shown) for said doors is holding said doors in a locked position. The lower end of the lever 40 is provided with an angular lug 41' (Figure 7) which, when the lever is in the position shown in Figure 1, engages a radial slot 45 provided in a disk 46, which is secured to one of the vertical crank arm shafts 28. At the same time, a pivoted angular latch member 47 carried by the lower end of the handle 40' has engaged a transverse rod 48. This rod has entered one of two notches 47' which are formed in the underside of the latch member. Therefore, at this time the actuating lever 40 cannot be swung to operate the locking mechanism until the angular latch member 47 has been swung to disengage its notch 47' from the transverse rod 48. Neither can the worm 34 be rotated to rotate the vertical shaft 28, because the lug 41' of the actuating lever 40 is engaging in the slot 45 provided in the disk 46 which is secured to one of said shafts. Thus, until the locking bar 12 is actuated by swinging the lever 40 outwardly to the position shown in Figure 2 so as to disengage the lug 41' from the slot 45, the crank arms 26 cannot be operated and, therefore, the doors cannot be opened or closed until after the locking mechanism has been actuated. It is noted that the engagement of the lug in the slot also prevents operation of the propelling bar and when it is desired to open the doors, it is first necessary to swing the pivoted latch 47 at the lower end of the lever 40 so as to disengage the notch 47' from the transverse rod 48. The lower end of the lever 40 is then swung outwardly to the position shown in Figure 2, whereby the locking bar 12 is moved longitudinally to operate the locking mechanism of each door. At the same time the lever is swung to move the bar 12 the lug 41' is disengaged from the notch 45 whereby it is possible to rotate the vertical shaft 28 which carries the crank arms 26. It is noted that when the lever is swung outwardly to the position shown in Figure 2 the second notch 47' engages the transverse rods 48 to hold the lever in this position until such time as the latch 47 is again swung.

After the locking mechanism has been actuated as described, to unlock each door, a rotation is imparted to the crank arms 26 by means of the shaft 28, gears 33 and worm 34. The swinging of the crank arms will move the member 21, whereby the lazy tongs 13 are operated to impart a motion to the door propelling bar 11. Since the crank arms 26 move through an arc of 180 degrees to move the doors (not shown) from their completely closed to their completely open position, it follows that each shaft 28 rotates the same number of degrees. Therefore, the disk 46 which is carried by one of said shafts is also rotated through an arc of 180 degrees. This disk is provided with a second slot (Figure 7) 45' which is located diametrically opposite the slot 45. Thus, when the doors are in their completely closed position and the parts are in the position shown in Figure 1, the slot 45 is in alinement with the angular lug 41' which is secured to the lever 40. However, after the mechanism has been actuated to completely open the doors and the parts are in the position shown in Figure 2, then the slot 45' has moved into alinement with the lug 41', whereby after the doors are opened the actuating lever 40 for the locking bar 12 may be again swung inwardly to lock the doors in their open position.

In Figures 1 to 7, the operating mechanism has been shown as mounted at the end of the cell row or block. The location of this mechanism is not to be limited to this location as it could be mounted at any point along the cell row and above any particular cell. The mounting of the structure at an intermediate point along the cell row is clearly shown in Figures 8 to 10. By observing these figures, it will be seen that the actual operating mechanism, that is, the lazy tongs 13, member 21 and crank arms 26 are exactly the same. However, since the mechanism is located above the cell, the vertical shaft 28 cannot be used. In place thereof a pair of stub shafts 59 have their upper ends braced by the transverse bracing member 51 while their lower ends are journaled in bearings 52 supported on the bottom of the casing 10. The upper end of the stub shaft, of course, carries the crank arms 26 and a rotation of the shaft 50 will impart the same motion to the door propelling bar 11 with which the lazy tongs 13 are connected, as has been hereinbefore described. For imparting a rotation to the stub shafts 50, said shafts are provided with gears 53 which are secured to said shafts near the lower end thereof. A transverse worm shaft 54 extends across the bottom of the casing 10 and projects outwardly through the front wall of said casing. This shaft is provided with a pair of worms 55 which are adapted to engage the gears 53 secured on the shafts 50. It is noted that one of the worms 55 is provided with right hand threads, while the other gear is provided with left hand threads, whereby upon rotation of said worm the shafts 50 are rotated in an opposite direction to swing the crank arms 26 toward each other. The extended end of the worm shaft 54 passes through the inner wall of a control compartment 56 and is provided with a sprocket 57 secured thereto. A drive chain 58 passes over this sprocket and also over a sprocket 59 which is mounted on a stub shaft 60 located at the lower end of the compartment 56 and supported in a suitable bracket 61. The outer end of the sprocket shaft 60 carries a disk or hand wheel 62 provided with a suitable handle 63 whereby manual operation or rotation of the shaft 60 may be accomplished.

With this arrangement, it is obvious that when the disk 62 is rotated a rotation is imparted to the worm shaft 54 by means of the sprockets 57 and 59 and the chain 58. Rotation of the worm shaft 54, of course, rotates the worms 55, which in turn, rotates the shaft 50 to swing the crank arms 26 and move the door propelling bar 12.

For actuating the locking bar 12, said bar is provided with a slot 64 (Figure 9) through which one end of a bell crank lever 65 extends. This end of the lever is held within the slot by a pin 66. The lever is pivoted on a suitable bracket 67, which is secured to the side wall of the casing 10 and the other end of the lever is pivoted to a laterally extending actuating bar 68, which bar passes through the wall of the casing. The bar 68 also extends through the rear wall of the casing. The bar 68 also extends through the rear wall of the control compartment 56 and is pivoted to the upper end of an actuating lever 69 which is similar to the lever 40. The actuating lever 69 is pivoted near its upper end to a bracket 70 mounted within the compartment. By swinging the lower end of the lever 69 outwardly the actuating bar 68 is moved inwardly, to swing the bell crank lever and thus impart a longitudinal movement to the locking bar 12. As the locking bar is actuated an angular lug 71 secured to the side of the bar 12 is disengaged from a slot 72 of a disk 73, which disk is mounted on one of the shafts 50. The lug 71 and disk 73 are similar to the lug 41' and disk 46 described in the first form (Figures 1 to 7). With the parts in the position shown in Figures 8 and 9, the doors are in their locked position. After the actuating lever 69 is swung to impart a longitudinal movement to the locking bar 12, the lug 71 is disengaged from the disk 73 whereby the door propelling bar 11 may be moved by swinging the crank arms through the medium of the worms 55. However, until the locking bar 12 is swung to disengage the lug 71, the crank arms 26 cannot be operated to operate the propelling bar 11, as is the case in the first form. Therefore, the door propelling mechanism cannot be actuated until after the doors are unlocked.

In the form of the invention shown in Figures 1 to 7 and Figures 8 to 10, the crank arms 26 have been shown located in the same horizontal plane. Therefore, when said arms are swung they must pass each other and for this reason the vertical shafts 28 and 50 which carry said crank arms must be spaced sufficiently far apart to permit such passing of the crank arms during their swinging movement. Therefore, with the structure shown in Figures 1 to 10, it is necessary that the casing 10 be of sufficient width to accommodate the swinging movement of the crank arms 26. In some instances, it may not be desirable for the casing 10 to be of such width, and therefore, it would be necessary to employ the structure shown in Figures 11 to 16. It is noted that in this form all of the operating mechanism is shown as mounted at the end of the casing above the end cell but it could be mounted at any point therealong by merely increasing the length of the shaft 97. The casing 10 does not project outwardly from this end cell and, therefore, the space necessary for this extended portion, as shown in Figures 1 to 7, is conserved. Also the large control compartment 30 is eliminated and only a very narrow compartment 102 is necessary, as will be described.

Referring specifically to Figures 11 to 16, it will be seen that the door propelling bar 11 and the locking bar 12 are exactly the same as those shown in the first form, Figures 1 to 7. The door propelling bar has its outer end guided by the slotted guide 17 in the same manner, and is secured to the lazy tongs 13 exactly as in the first form. The outer end of the locking bar 12 is pivoted to the actuating lever 40 which lever is pivoted to a supporting bracket 43'.

In this form the yoke member 21 is eliminated and in place thereof a flat plate 80 is mounted to move longitudinally within the casing 10 and has one end of the actuating bar 19 secured thereto. The other end of the bar is, of course, secured on the central pivot pin 20 of the lazy tongs 13, whereby movement of the plate 80 will actuate said tongs. Since the casing 10 above the cell, where the plate 80 is mounted, is much narrower than the enlarged extended portion of the casing, as shown in Figures 1 to 7, it is obvious that said plate must be narrower or shorter than the yoke member 21, as shown in Figure 15. The sides of the plate 80 are braced by suitable flanges 80'. A pair of opposed, transversely extending angle bars 81 are located on the top of said plate, and a similar pair 81' are secured to the underside of said plate, and these angles form slot 82 and 82' at the top and bottom of the plate. An upwardly extending T-member 83 is provided at each end of the plate and the arms of these members carry rollers 84 which ride in channeled tracks 85 secured to the inner walls of the casing 10. The extreme outer end of each arm of the T-member is provided with a laterally extending guide roller 86 which rides on the vertical wall of the channeled guide member 85 (Figure 15). With this arrangement, it is obvious that the plate 80 is positively guided in its longitudinal movement.

Since the casing 10 above the jail cells is narrower than the enlarged extended portion of the casing shown in Figures 1 to 7, it follows that the particular mounting of the crank arms 26, as disclosed in the first form, cannot be used, because there is not sufficient space between the vertical side walls of the casing to accommodate the double crank arm movement. In order to permit crank arms to impart a longitudinal movement to the plate 80, it is necessary that one crank arm be arranged to override the other, whereby they are located in different horizontal planes and may thus pass each other during their swinging movement. Such an arrangement of the crank arms is clearly disclosed in Figures 11 to 16, wherein one crank arm 87 is provided with a pin 87' at its outer end, which pin extends upwardly from the crank arm and is engaged in the slot 82' formed on the underside of the plate 80. This crank arm is carried by a stub shaft 88 which has its upper end extending through a transverse brace member 89 while its lower end is journaled in a suitable bearing 90 supported in the bottom of the casing. A second shaft 91, similar to the shaft 88, is mounted at the other side of the casing in a similar manner. The upper end of this shaft 91 carries a second crank arm 92 which crank arm is offset so as to pass around the end of the opposite crank arm and also around the side of the plate 80. This second crank arm overlies the plate 80 (Figure 15) and has its outer end provided with a pin 92' which engages in the slot 82 formed in the top of the plate 80. The inner end of the offset crank arm 92 has an upwardly extending stud 93 which is journaled in a suitable supporting bracket 94, whereby rigidity is added to this crank arm which is somewhat weakened by the offset therein.

By observing Figure 13, it will be seen that the crank arms 87 and 92, when swung, will impart a longitudinal movement to the plate 80 whereby the lazy tongs will be operated and the door propelling bar 11 moved. The same motion will be imparted to the plate as is imparted to the yoke member 21, described in the first form, that is, the plate 80 will be started into motion slowly, which motion will be gradually increased to a maximum at mid-travel and then decelerated to zero at the finish. The only difference between this form and the form described in Figures 1 to 7, is that the crank arms 87 and 92 have their supporting shafts 88 and 91 set closer together than are the crank arm shafts 28 (Figure 3). The crank arms 87 and 92 are, of course, located in different horizontal planes and, therefore, may pass each other in their swinging movement. This arrangement conserves a great deal of space and permits the mechanism to be mounted in the usual casing 10 without providing an enlarged portion to house said mechanism, thus making this form particularly adaptable when conservation of space is necessary or desirable.

For imparting a rotation to the crank arm shafts 88 and 91, each shaft is provided with a gear 95. A worm 96 extends between the gear 95 being mounted on a longitudinally extending shaft 97. One end of the shaft is supported in a suitable bearing 97' while its other end extends through the end wall of the casing 10 and carries a sprocket 98. A drive chain 99 passes over this sprocket, as well as over a sprocket 100 which is mounted on a stub shaft 101 at the lower end of a narrow control compartment 102. The outer end of the stub shaft 101 carries a rotatable disk 103 provided with a suitable handle 104, whereby manual rotation of the shaft 101 and sprocket 100 may be accomplished. With this arrangement, it is obvious that rotation of the disk 103 will rotate the worm shaft 97 by means of the chain 99 and sprocket 98. A rotation of the worm shaft will, of course, rotate the worm 96, thereby rotating the shafts 88 and 91 through the medium of the gears 95.

For preventing an operation of the worm 96, and crank arms 87 and 92 before the locking bar 12 has been moved to unlock each door and also for preventing operation of the locking bar unless the doors are entirely open or closed, said locking bar is provided with an angular lug 105 (Figure 14). With the doors in a locked position, at which time the locking bar and its actuating lever are in the position shown in Figure 1, this lug 105 is adapted to engage a radial notch 106 provided in a disk 107 secured on the shaft 88. Obviously, with the lug in engagement with the notch the shaft 88 and the shaft 91 cannot be rotated. When the doors are unlocked by the movement of the locking bar 12 the lug 105 is disengaged from the notch, whereby a rotation of the shaft may be accomplished by means of the worm 96 and chain drive, as has been explained. While the worm is rotating to move the doors from one position to another, the actuating lever which controls the locking bar 12 cannot be swung because the notches 106 in the disk are out of alinement with the lug 105. Therefore, it will be seen that whenever the doors are in a locked position it is impossible to operate the mechanism which moves the door propelling bar and also while the doors are in motion, it is impossible to actuate the locking bar.

In all of the forms, it is pointed out that the crank arms are used to impart a rotation to a longitudinally movable member which actuates the lazy tongs 13 and thus, moves the door propelling bar. The crank arms move through an arc of 180 degrees in moving the doors (not shown) from a completely closed to a completely opened position. With such arrangement, a slow starting motion is imparted to the doors, which motion is gradually increased to a maximum at mid-travel. From this mid-point of travel, the motion is gradually decreased in the same proportion that it was increased during the first half of its travel, whereby the doors are brought to a slow stop. In reversing the movement of the doors, the crank arms are operated in a reverse direction and the same motion is imparted on the return travel. By providing a comparatively rapid intermediate travel with a relatively slow start and finish, the operation of the doors is greatly facilitated because the inertia of said doors is readily overcome. Therefore, it is easy for the operator to start the doors in motion and slamming or jarring of the doors as they complete their travel is entirely eliminated. It has been found that this jar produced by the abrupt stopping of the rapidly moving doors, places a strain on the operating mechanism for propelling the doors and thereby reduces the life of said mechanism, as well as causes constant adjustment to be made to keep the same in working order. All of these disadvantages are overcome with the structure hereinbefore described. It is noted that in the first form the worm and gears which rotate the crank arm shaft are located at the lower end of the control compartment, while in the other two forms the operating worm and gears are located in the casing 10 and operated by a chain drive. It would be possible to operate the structure of the first form with a chain drive, if desired and the invention is not to be limited to the particular position or location of any of the operating parts.

What I claim and desire to secure by Letters Patent, is:

1. A jail door operating mechanism including, a door propelling bar extending longitudinally over the jail cells and adapted to be connected with the jail doors, an actuating member movable in a fixed plane connected with said bar for actuating the same, and a pair of swinging crank arms connected with the member for imparting motion thereto, whereby the propelling bar and doors are operated.

2. A jail door operating mechanism including, a door propelling bar extending longitudinally over the jail cells and adapted to be connected with the jail doors, an actuating member movable in a fixed plane connected with said bar for actuating the same, said member having a transverse slot therein, and a pair of swinging crank arms having their outer ends engaging the slot in the member for imparting motion thereto, whereby the propelling bar and doors are actuated.

3. A jail door operating mechanism including, a door propelling bar extending longitudinally over the jail cells and adapted to be connected with the jail doors, an actuating member movable in a fixed plane connected with said bar for actuating the same, a pair of swinging crank arms having their outer ends connected with the member, vertical shafts having the crank arms secured to their upper ends, gears fastened on said shafts, and a rotatable worm located between the gears in constant engagement therewith, whereby rotation of said worm rotates the shafts and swings the crank arms to move said member, and thereby operate the propelling bar and doors.

4. A jail door operating mechanism including, a door propelling bar extending longitudinally over the jail cells and adapted to be connected with the jail doors, an actuating member movable in a fixed plane connected with said bar for actuating the same, a pair of swinging crank arms having their outer ends connected with the member, one of the crank arms being offset whereby said crank arms lie in different horizontal planes and pass each other in their swinging movement, vertical shafts having the crank arms secured to their upper ends, gears fastened on said shafts, and a rotatable worm located between the gears in constant engagement therewith, whereby rotation of said worm rotates the shafts and swings the crank arms to move said member, and thereby operate the propelling bar and doors.

5. A jail door operating mechanism including, a door propelling bar extending longitudinally over the jail cells and adapted to be connected with the jail doors, an actuating member movable in a fixed plane connected with said bar for actuating the same, a pair of swinging crank arms having their outer ends connected with the member, vertical shafts having the crank arms secured to their upper ends, gears fastened on said shafts, a laterally extending shaft disposed at a right angle to the vertical shaft, and oppositely threaded worm screws on said shaft for engaging the gears of the vertical shafts, whereby rotation of the lateral shaft rotates the vertical shaft to swing the crank arms and impart motion to the member, and thereby operate the propelling bar and doors.

6. An operating mechanism for jail doors including, a door propelling bar adapted to be connected to a door, a door locking bar for actuating the locking mechanism of said door, a movable member connected with the door propelling bar for imparting motion thereto, swinging means having a connection with the member for moving the member slowly at the start and finish of its travel and comparatively rapidly through its intermediate travel, whereby a similar motion is imparted to the door propelling bar and door, and means for preventing actuation of the last named means until the door locking bar has been operated to unlock said door.

7. An operating mechanism for jail doors including, a door propelling bar adapted to be connected to a door, a door locking bar for actuating the locking mechanism of said door, an actuating member movable in a fixed plane connected with the door propelling bar for imparting motion thereto, swinging means having connection with the member for moving the member slowly at the start and finish of its travel and comparatively rapidly through its intermediate travel, whereby a similar motion is imparted to the door propelling bar and door, and means for preventing actuation of the last named means until the door locking bar has been operated to unlock said door.

8. An operating mechanism for jail doors including, a door propelling bar adapted to be connected to a door, a door locking bar for actuating the locking mechanism of said door, a movable member connected with the door propelling bar by means of a lazy tongs for imparting motion thereto, swinging means for moving the member from zero and gradually increasing the motion to maximum at mid-travel and then gradually decelerating said motion to zero, whereby the door undergoes a similar motion in traveling from an open to a closed position or vice versa, and means for preventing actuation of the last named means until the door locking bar has been operated to unlock said door.

9. An operating mechanism for jail doors including, a door propelling bar adapted to be connected to a door, a door locking bar for actuating the locking mechanism of said door, a movable member connected with the door propelling bar by means of a lazy tongs for imparting motion thereto, swinging means having a slidable connection with for moving the member slowly at the start and finish of its travel and comparatively rapidly through its intermediate travel, whereby a similar motion is imparted to the door propelling bar and door, means for preventing actuation of the last named means until the door locking bar has been operated to unlock said door, and means for preventing operation of the locking bar while the propelling bar is actuated and the doors are in motion.

10. An operating mechanism for jail doors including, a door propelling bar adapted to be connected to a door, a door locking bar for actuating the locking mechanism of said door, an actuating member movable in a fixed plane connected with the door propelling bar by means of a lazy tongs for imparting motion thereto, swinging means for moving the member slowly at the start and finish of its travel and comparatively rapidly through its intermediate travel, whereby a similar motion is imparted to the door propelling bar and door, means for preventing actuation of the last named means until the door locking bar has been operated to unlock said door, and means for preventing operation of the locking bar while the propelling bar is actuated and the doors are in motion.

11. A door operating mechanism including, a door propelling bar adapted to be connected to a door, a slotted actuating member movable in a fixed plane connected with said bar for imparting motion thereto, and a swinging crank arm having means at its outer end engaging within the slot of the actuating member and arranged to move the member to operate the propelling bar and door.

12. A jail door operating mechanism including, a door propelling bar extending longitudinally over the jail cells and adapted to be connected to the jail doors, an actuating member movable in a fixed plane connected with the bar for actuating the same, a rotatable shaft, an arm mounted on the shaft and having connection with the member for moving the same when the shaft is rotated, and a worm and gear for rotating the shaft, the pitch of the groove of said worm being such as to prevent reverse operation of the mechanism.

13. A jail door operating mechanism including, a door propelling bar extending longitudinally over the jail cells and adapted to be connected to the jail doors, an actuating member movable in a fixed plane located adjacent one end of the bar, a lazy tongs pivoted to the member and the bar to connect the same so as to impart movement to the bar when the member is moved, and a swinging crank arm having its outer end slidably and pivotally connected to the member for imparting movement thereto.

JAMES A. YOUNGBLOOD.